United States Patent [19]

Yarian

[11] 4,334,015

[45] Jun. 8, 1982

[54] IMAGING COMPOSITIONS

[75] Inventor: Dean R. Yarian, Afton, Minn.

[73] Assignee: Minnesota Mining and Manufacturing Company, St. Paul, Minn.

[21] Appl. No.: 41,693

[22] Filed: May 23, 1979

[51] Int. Cl.[3] .......................... B01J 13/02; B41M 5/16; B41M 5/22; C09D 11/00; C09B 26/02

[52] U.S. Cl. .......................................... 435/1; 106/21; 106/32; 252/316; 427/150; 428/307; 428/537; 282/27.5; 400/204; 428/914; 428/320.6; 401/52; 118/264; 162/140; 162/162; 564/149; 564/150

[58] Field of Search ....................... 106/21, 22, 24, 32; 260/559 A, 559 H; 282/27.5; 427/150, 151; 428/307, 411, 537, 913, 914; 252/316; 118/264; 162/140, 162; 400/204; 401/52; 435/1

[56] References Cited

U.S. PATENT DOCUMENTS

| | | | |
|---|---|---|---|
| 3,287,154 | 11/1966 | Haas | 117/36.9 |
| 3,481,759 | 12/1969 | Ostlie | 282/27.5 |
| 3,547,646 | 12/1970 | Hori et al. | 260/559 H |
| 3,809,668 | 5/1974 | Yarian | 260/30.6 R |
| 3,852,094 | 12/1974 | Yaian | 282/27.5 |
| 4,111,462 | 9/1978 | Lange et al. | 282/27.5 |

OTHER PUBLICATIONS

Sacconi, "Acylhydrazones of *o*-Oxy-and *o*-Aminoaldehydes and Ketones as Tridentate Complexing Agents", J.A.C.S, 75, 5435 (11-5-53).

Sacconi, "Chemical Reactions of Complexes, I. Action of Hydrozides on Nickel Disalicylaldehyde", J.A.C.S, 74, 4503 (9-20-52).

*Primary Examiner*—Bruce H. Hess

*Attorney, Agent, or Firm*—Cruzan Alexander; Donald M. Sell; Jennie L. Giese

[57] ABSTRACT

A composition capable of forming colored complexes with transition metal salts is provided which comprises an aromatic substituted hydrazone carried in an organic cosolvent vehicle. When employed in the art of carbonless paper the aromatic substituted hydrazone and the transition metal salt complex to form yellow colored images. The invention provides means for producing dark, black, neutral images by the reaction of the aromatic substituted hydrazones and conventional dithiooxamide complexing compounds, both carried in an organic cosolvent vehicle, with transition metal salts.

36 Claims, No Drawings

IMAGING COMPOSITIONS

The present invention relates to substantially colorless compositions which form colored complexes with transition metal ions. More particularly the invention relates to compositions comprising aromatic substituted hydrazones which form yellow complexes with transition metal ions and which can be combined with other color-forming components to provide dark, black imaging compositions.

Articles including record sheets and multisheet forms are prepared using the color-forming compositions.

Carbonless transfer papers have come into wide useage over the past several years. Ordinarily, these papers are printed and collated into form sets for producing multiple copies, impact on the top sheet causing each of the remaining sheets to form a mark thereon corresponding to the mark applied by machine key or stylus on the top sheet without carbon paper interleaves or carbon coatings. Of course, this sequence can be carried out through a number of sheets just as if carbon paper had been used. The top sheet of the paper on which the impact is immediately made usually has its back surface coated with tiny microscopic capsules containing an active ingredient for mark production. A receptor sheet, placed in contact with such back face of the top sheet has its front surface coated with a material having a component reactive with the contents of the capsules so that when the capsules are ruptured upon impact by stylus or machine key, the contents of the ruptured capsules react with a coreactant therefor on the receptor sheet and a mark forms corresponding to the mark impressed by the stylus or machine key. These self-marking impact transfer papers are designated by the terms CB, CFB and CF, which stand respectively for "Coated Back", "Coated Front and Back", and "Coated Front." Thus, the CB sheet is usually the top sheet having its back surface coated with the microcapsules, and it is the sheet on which the impact impression is directly made. The CFB sheets are the intermediate sheets which form a mark on the front surface thereof and transmit the contents of ruptured capsules from the back surface thereof to the front of the next succeeding sheet. The CF sheet is the last (bottom) sheet used which is only coated on the front (top) surface to form an image thereon and is not coated on the back (bottom) surface, as no further transfer is desired. While it is customary to coat the capsules on the back surface and coat the coreactant for the capsules on the front surface, this procedure could be reversed if desired. With some systems, e.g. those using urea-formaldehyde polymer shelled capsules and dithiooxamide derived image forming dye-precursors (U.S. Pat. No. 3,516,846 and Canadian No. 780,358) coatings need not be used at all, and the coreactive ingredients may be carried in the sheets themselves, or one may be carried in one of the sheets and the other may be carried as a surface coating. Further, the reactants may both be in capsules and may both be liquids.

The imaging chemistry generally used in these systems provides a purple or blue image. Compositions wherein dithiooxamide or the dibenzyl or dioctanoyl oxyethyl derivatives of dithiooxamide (hereinafter DBDTO and DOEDTO respectively) are used to complex with transition metal ions derived from transition metal salts, e.g. nickel 2-ethylhexoate or the like, are commonly used to provide a purple image (U.S. Pat. No. 3,516,846 and Canadian No. 780,358). For many uses these colors are less esthetically pleasing and do not perform as effectively in optical readers, copying machines, etc. where a dark, black image is desirable.

It is known that a yellow dye incorporated in the DTO-nickel imaging system provides a black image. However, the dye contributes a yellow color to the papers. The present invention provides means to obtain black imaging on white paper without discoloration of the white paper background.

The present invention provides color-forming compositions which, when complexed with transition metal ions, can provide compositions having, among others, a dark black color. This is accomplished in the present invention by the use of certain novel aromatic substituted hydrazone compounds which provide an intense yellow color when individually complexed with nickel. When the hydrazones of the present invention are used in admixture with dithiooxamide (DTO) and its derivatives, which provide a blue-purple color when individually complexed with transition metal salts, the resulting complex composition appears black to the observer.

The color-forming compounds and compositions of the present invention can be used as DTO based chemistries have previously been used. For example, pressure-sensitive carbonless transfer and record sheets which are capable of providing colored images can be provided by encapsulating the hydrazone compounds and a cosolvent vehicle in substantially impermeable, pressure-rupturable microcapsules and applying these encapsulated materials to paper substrates. Alternatively, a composition comprising the hydrazone in a cosolvent vehicle can be carried by a variety of materials such as woven, non-woven or film transfer ribbons for use in impact marking systems such as typewriters and the like, whereby the hydrazone is transferred to a record surface containing a transition metal salt by impact transfer means. Further, a composition comprising the hydrazone and a cosolvent vehicle could be absorbed in a porous pad for subsequent transfer to a coreactive record surface by a transfer means such as a portion of the human body, e.g. a finger, palm, foot or toe, for providing fingerprints or the like.

As noted above, the color-forming composition of the present invention can be readily micro-encapsulated by techniques known in the art, for example as described in U.S. Pat. No. 3,516,941. Pressure-sensitive record and/or transfer sheets can be provided as are known in the art.

The color-forming compounds of the present invention are colorless aromatic substituted hydrazones which complex with nickel. The complexes exhibit light absorption characteristics such that they appear as intensely yellow colored complexes. When used in admixture with conventional DTO derivative transition metal complexing compounds, the light absorption properties of the individual complexes are additive and a substantial portion of light in the visible spectrum is absorbed providing a neutral, black color.

The aromatic substituted hydrazone compounds which are useful in the present invention are from a class of compounds having the structural formula:

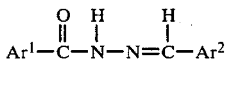

wherein $Ar^1$ and $Ar^2$ are independently selected aromatic substituents, $Ar^1$ being selected from the group of aromatic substituents consisting of phenyl, substituted phenyl, napthyl, and substituted naphthyl and $Ar^2$ being selected from the group of aromatic substituents consisting of substituted phenyl and substituted naphthyl. It is necessary for proper functioning of the hydrazones that the $Ar^2$ group bear a hydroxyl group substituent adjacent (ortho) to the site of attachment of the carbon atom attached by a double bond to the nitrogen atom.

The color-forming system of the present invention requires two coreactants, a substituted aromatic hydrazone of the type described above dissolved in a reaction implementing cosolvent vehicle and a transition metal salt. When one of the coreactants is encapsulated in substantially impermeable pressure-rupturable microcapsules, a solution of the other coreactant will be applied to a second surface for example, a record sheet, and dried. The capsule layer and the second or copy surface will then be placed in such a relationship to each other that rupture of the capsules by writing pressures will release the entrapped contents and allow the reactants to coreact thereby forming a dense colored image corresponding to the original mark in the second or copy surface. Alternatively, both coreactants may be encapsulated and located either in adjacent sheets in superposable relationship or on the same surface of a single sheet. The capsular material is so rugged and impervious to the coreactants that it may be interspersed with a fluid suspension of a heavy metal salt and applied to a surface as a single coating with little danger of premature image formation. In addition the capsule material need not be applied as layers, but may be subjected to the rigors of paper formation on a paper machine and can be directly incorporated into the paper, the capsules being carried as a filler therewithin. Similarly the coreactant can be incorporated into a second or copy surface or may be carried adjacent to the capsules in the same web of paper. When used along with conventional DTO complexing compounds the DTO derivative is also encapsulated either in the same shell as the hydrazone or in separate capsules.

When the transition metal co-reactant is carried within the paper web, it can conveniently be incorporated into a paper slurry as a sizing so that it may function both as a sizing and as a co-reactant for the liquid reactant. One way to carry out this procedure is to add a water soluble rosin salt such as sodium rosinate to the paper slurry along with the capsules, or prior to or after addition of the capsules, but prior to the deposition of the slurry onto the paper making machine so that the rosin has time to find the pulp fibers in the slurry; and then add a water soluble metal compound which insolubilizes the rosin such as nickel sulphate, chloride, or nitrate or similar salt of copper, cobalt, etc. to the slurry. Such transition metals react with the rosin salt to form an insoluble metal rosinate sizing on the pulp fibers having available metal cations for color formation.

While many transition metals, e.g., nickel, tin, zinc, iron, cobalt, copper, cadmium, etc. will serve as coreactants with the aromatic substituted hydrazones of the present invention to rapidly produce yellow images, nickel or nickel dominated sizing mixtures are preferred. Nickel rosinate, for example, provides a fairly colorless sizing which does not unduly increase the background color of white papers yet reacts fairly quickly with the hydrazone. Other transition metals are known to provide a white color upon reaction with the hydrazones of the present invention, as for example, $MnSo_4$, $CoCl_2$. Thus, these transition metals and hydrazones of the present invention would produce white images when used in connection with colored papers.

It can be readily seen that, by means of this invention, manifold copies of typewritten or written material may be made without the use of carbon manifold paper by placing a series of the above-described sheets normally connected along a common edge in superposed relation in a typewriter. For example, the first sheet may be the original which will be contacted by the type of the typewriter. The underside of said sheet will contain the layer of microscopic capsules of the hydrazone in a cosolvent, alone or in combination with encapsulated DTO derivatives in a cosolvent. In superposed position with the capsule layer will be a copy or record sheet treated with a transition metal salt on the first or upperside. The underside of said copy sheet contains a layer of microscopic capsules, containing the hydrazone alone, or in combination with encapsulated DTO derivatives, which may contact a third sensitized copy sheet. By the successive addition of a number of copy sheets treated with a transition metal salt on one side and a layer of microscopic capsules containing the hydrazone, alone or in combination with encapsulated DTO derivatives, on the underside, a reasonably large number of copies may be made thereby. Utilizing an alternative embodiment, the production of a plurality of copies may be accomplished by means of a sheet that contains both the coreactants on the same surface.

Capsules containing the hydrazones of the present invention, or DTO derivatives may be formed from any substantially impermeable film-forming material sufficiently strong to withstand necessary handling. A particularly suitable class of film-forming materials are aldehyde condensation polymers and particularly urea-formaldehyde condensation polymers. The capsules are preferably in a size range of from 1 to 50 microns and are preferably used in an amount from 5 to about 50 parts by weight dry capsules per 100 parts pulp when incorporated within the body of paper sheets.

It is an important feature of the present invention that the liquid employed as the solvent for the encapsulated reactant be a solvent for the coreactant as well, whether the latter is also encapsulated or not. This same solvent then serves as a reaction implementing medium for the two reactants at the time of rupture of the capsules and is commonly referred to as a cosolvent. As examples of cosolvents which fulfill the above criteria, mention may be made of cyclohexane, tributyl phosphate, diethyl phthalate, toluene, xylene, 3-heptanone and the like. The selection of additional suitable cosolvents will be obvious to those skilled in the art.

The substituted hydrazones of the present invention are prepared according to methods found in the technical literature, see Journal of the American Chemical Society, 75, 5434 (1953). Certain modifications are used to increase the yield, to reduce unnecessary further reactions, and to prevent formation of undesirable side products. The general equation for the production of hydrazones useful in the present invention is:

$$Ar^1CO_2R + N_2H_4 \rightarrow Ar^1CONHNH_2 + Ar^2CHO \rightarrow Ar^1CONHN{=}CHAr^2$$

$Ar^1$ is selected from the group consisting of phenyl, substituted phenyl and substituted naphthyl and $Ar^2$ is selected from the group consisting of o-hydroxyphenyl, substituted o-hydroxyphenyl and o-hydroxy naphthyl. Preferred groups of substituted aromatic hydrazones are listed below in Tables I and II. Several of these hydrazones (aromatic substituted hydrazone numbers 20 and 21, hereinbelow) are believed to be novel, never having been disclosed in the art.

TABLE I

Substituted Hydrazones From Salicylaldehyde and Substituted Benzoic Acid Hydrazides

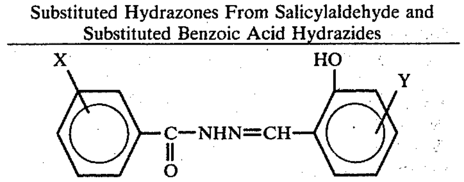

| Aromatic Substituted Hydrazone Number | X | Y |
|---|---|---|
| 1 | H | H |
| 2 | H | 5-$NO_2$ |
| 3 | H | 5-Cl |
| 4 | H | 3-$CH_3O$ |
| 5 | H | 3-$C_2H_5O$ |
| 6 | o-$CH_3$ | H |
| 7 | m-$CH_3$ | H |
| 8 | p-$CH_3$ | H |
| 9 | p-(t-$C_4H_9$) | H |
| 10 | o-HO | H |
| 11 | p-HO | H |
| 12 | o-Cl | H |
| 13 | o-$NH_2$ | H |
| 14 | p-$NH_2$ | H |
| 15 | m-$NO_2$ | H |
| 16 | p-$NO_2$ | H |
| 17 | m-$CH_3$, o-HO | H |

TABLE II

Substituted Hydrazones From 2-Hydroxy-1-naphthaldyde and Substituted Benzoic Acid Hydrazides

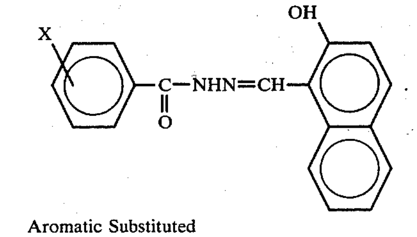

| Aromatic Substituted Hydrazone Number | X |
|---|---|
| 18 | H |
| 19 | p-$CH_3$ |
| 20 | p-(t-$C_4H_9$) |
| 21 | o-$NH_2$ |

Another preferred aromatic substituted hydrazone, number 22, is salicylaldehyde-3-hydroxy-2-naphthoyl hydrazone, prepared from salicylaldehyde and 3-hydroxy-2-naphthoic hydrazide.

The preferred aromatic substituted hydrazones are prepared by refluxing the methyl or ethyl ester of the appropriate aromatic acid (such as benzoic acid, substituted benzoic acid, or substituted naphthoic acid) with 64% aqueous hydrazine to yield the aromatic hydrazide (Equation 1). The hydrazide is then refluxed with an ortho-hydroxy aromatic aldehyde (such as salicylaldehyde or 2-hydroxy-1-naphthaldehyde) in toluene to yield the hydrazones (Equation 2) listed in Tables I and II.

$$Ar^1-COOCH_3 + N_2H_4 \xrightarrow[\Delta]{} Ar^1-CONHNH_2 + CH_3OH \quad (1)$$

$$Ar^1-CONHNH_2 + Ar^2COH \xrightarrow[\Delta]{} Ar^1-CONHN{=}CHAr^2 + H_2O \quad (2)$$

All of the preferred aromatic substituted hydrazones listed in Tables I and II yield a very intense yellow solution when dissolved in tributyl phosphate and mixed with a dilute solution of nickel rosinate on a spot test plate. The hydrazones listed in Table II, prepared by condensing the benzoic acid hydrazide with 2-hydroxy-1-naphthaldehyde, produce the most intense yellow color with nickel. Thus, the hydrazones prepared from 2-hydroxy-1-naphthaldehyde (Table II) are most effective in producing neutral black images when combined with nickel and dithiooxamide derivatives.

The preferred hydrazones produce yellow complexes with nickel when dissolved in tributyl phosphate in a concentration range of from about 0.2% to about 10% by weight. At a concentration of less than about 0.2% no visible yellow complex with nickel is observed. The maximum concentration of the hydrazone is a function of its solubility in the selected cosolvent. When tributyl phosphate is employed as the cosolvent the maximum concentration of aromatic substituted hydrazone is 10% by weight. Each of the preferred aromatic substituted hydrazones was encapsulated in substantially impermeable pressure-rupturable microcapsules and evaluated in self-contained hand sheets prepared according to assignee's Canadian Pat. No. 780,358. Self-contained handsheets contain both coreactents in the same sheet of paper. Each hydrazone was encapsulated with dithiooxamide derivatives, to determine its effect on the DTO-nickel complex purple image color, and alone, to determine its yellow color forming capability. The results of this evaluation are listed in Table III.

TABLE III

Evaluation of Substituted Aromatic Hydrazones

| Aromatic Substituted Hydrazone # | Acid Moiety 1 | Aldehyde Moiety 1 | Hydrazone Conc. in Fill(%) 2 | Image Appearance with DTO | Image Appearance w/o DTO |
|---|---|---|---|---|---|
| 1 | benzoic | salicylaldehyde | 3.2%<br>3.2 < 7.0 | purple<br>blue-black | light yellow |
| 2 | benzoic | 5-nitro salicylaldehyde | <3.2 | purple | light yellow |
| 3 | benzoic | 5-chlorosalicylaldehyde | 3.2<br>3.2 < 7.0 | blue-black<br>blue-black | yellow<br>yellow |
| 4 | benzoic | 3-methoxy salicylaldehyde | <3.2 | purple | none |
| 5 | benzoic | 3-ethoxy salicylaldehyde | <3.2 | purple | light yellow |
| 6 | o-toluic | salicylaldehyde | 3.2 | purple | light yellow |
| 7 | m-toluic | salicylaldehyde | 3.2 | blue-black | yellow |

TABLE III-continued

Evaluation of Substituted Aromatic Hydrazones

| | | | | | |
|---|---|---|---|---|---|
| 8 | p-toluic | salicylaldehyde | <3.2 | purple | light yellow |
| 9 | p-(t-butyl) benzoic | salicylaldehyde | <3.2 | purple | light yellow |
| 10 | o-hydroxy-benzoic | salicylaldehyde | <3.2 | purple | light yellow |
| 12 | o-chlorobenzoic | salicylaldehyde | 3.2 | purple | light yellow |
| 13 | o-aminobenzoic | salicylaldehyde | 3.2 | blue black | yellow |
| | | | 7.0 | blue black | yellow |
| 14 | p-aminobenzoic | salicylaldehyde | <3.2 | purple | light yellow |
| 15 | m-nitrobenzoic | salicylaldehyde | <3.2 | purple | light yellow |
| 16 | p-nitrobenzoic | salicylaldehyde | <3.2 | purple | light yellow |
| 17 | m-methyl-o-hydroxy benzoic | salicylaldehyde | 3.2 | purple | light yellow |
| | | salicylaldehyde | 7.0 | purple | light yellow |
| 18 | benzoic | 2-hydroxy-1-naphthaldehyde | 3.2 | gray-brown | Intense yellow |
| 19 | p-toluic | 2-hydroxy-1-naphthaldehyde | <3.2 | blue-black | light yellow |
| 20 | p-(t-butyl) benzoic | 2-hydroxy-1-naphthaldehyde | 3.2 | gray-brown | Intense yellow |
| 21 | o-amino benzoic | 2-hydroxy-1-naphthaldehyde | 3.2 | gray-brown | Intense yellow |
| 22 | 3-hydroxy-2-napthoic | salicylaldehyde | <3.2 | blue-black | yellow |

1 Substituted aromatic hydrazone

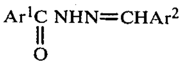

Acid Moiety Aldehyde Moiety

2 The fill solutions were prepared with 3.2% or 7.0% hydrazone and 37% TBP(tributyl phosphate). In several (cases some hydrazone precipitated on cooling the fill, resulting in lower hydrazone concentrations. Nominal fill compositions are given below:

| | 3.2% Hydrazone | | 7.0% Hydrazone | |
|---|---|---|---|---|
| Component | With DTO | Without DTO | With DTO | Without DTO |
| Hydrazone | 3.2% | 3.2 | 7.0 | 7.0 |
| DOEDO | 5.0 | — | 5.0 | — |
| DBDTO | 1.5 | — | 1.5 | — |
| TBP | 37.0 | 37.0 | 37.0 | 37.0 |
| Cyclohexane | 53.3 | 59.8 | 49.5 | 56.0 |
| | 100.0 | 100.0 | 100.0 | 100.0 |

Novel substituted aromatic hydrazone number 20(2-hydroxy-1-naphthaldehyde-p-(t-butyl) benzoyl hydrazone) and 21 (2-hydroxy-1-naphthaldehyde-o-aminobenzoyl hydrazone) have characteristics most suitable for combining with DTO-nickel systems to make carbonless paper of the type described in assignee's Canadian Pat. No. 780,358. Both hydrazones form intense yellow nickel complexes at a fill concentration of between about 1.5 and 3.5% by weight, are soluble in the capsule fill solution in excess of what is needed, are insoluble in water, and have complex forming reactions which have a speed approximately equal to the nickel-DTO reaction.

2-hydroxy-1-naphthaldehyde-o-aminobenzoyl hydrazone is prepared according to equations 1-3 below.

(1)

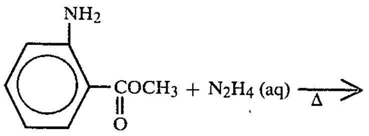

[the methyl ester of o-amino benzoic acid] [hydrazine]

-continued

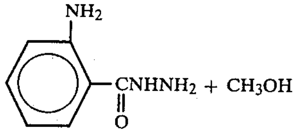

[o-aminobenzhydrazide]

(2)

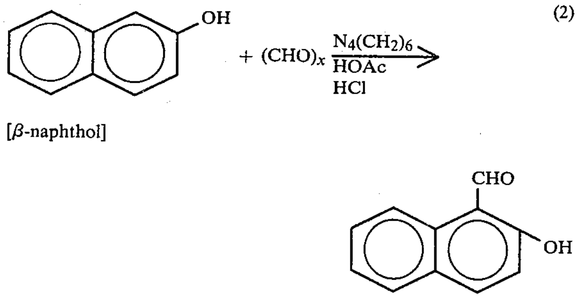

[β-naphthol]

[2-hydroxy-1-naphthaldehyde]

-continued (3)

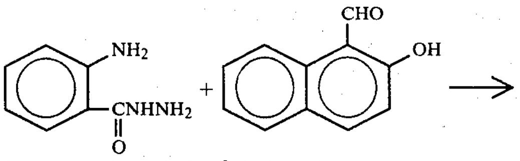

[o-aminobenzhydrazide] [2-hydroxy-1-naphthaldehyde]

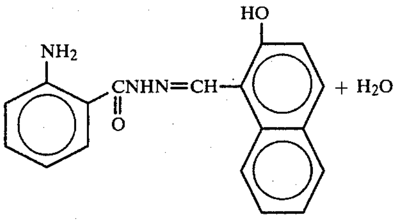

[2-hydroxy-1-naphthaldehyde-o-amino benzoyl hydrazone]

In reaction (1), o-aminobenzhydrazide in 70% yield is prepared by reacting the methyl ester of o-amino benzoic acid (methyl anthranilate) with 64% aqueous hydrazine. Equation (2) illustrates the preparation of 2-hydroxy-1-naphthaladehyde from beta-naphthol, paraformaldehyde, hexamethylene tetramine, acetic acid and hydrochloric acid. o-Aminobenzhydrazide and 2-hydroxy-1-naphthaldehyde are reacted, in Equation (3), to produce the preferred hydrazone, 2-hydroxy-1-naphthaldehyde-o-aminobenzoyl hydrazone in 80–90% yield.

The particularly preferred substituted aromatic hydrazone 2-hydroxy-1-naphthaldehyde-p-(t-butyl)-benzoyl hydrazone is prepared in a manner similar to the preparation of 2-hydroxy-1-naphthaldehyde-o-aminobenzoyl hydrazone, Equations (1) through (3) above. Since the ester of p-(t-butyl)-benzoic acid is not available the preparation of this hydrazone requires the additional step of esterification of the benzoic acid. The ester of p-(t-butyl)-benzoic acid is reacted with hydrazine to produce p-(t-butyl)-benzhydrazide. This hydrazide is then reacted with 2-hydroxy-1-naphthaldehyde to yield 2-hydroxy-1-naphthaldehyde-p-(t-butyl)-benzoyl hydrazone.

The preferred aromatic substituted hydrazones, 2-hydroxy-1-naphthaldehyde-o-aminobenzoyl hydrazone and 2-hydroxy-1-naphthaldehyde-p-(t-butyl)-benzoyl hydrazone, were encapsulated in the prefered fill solutions and used to prepare self-contained handsheets in the manner described in assignee's Canadian Pat. No. 780,358. The capsule fill compositions contain the DTO derivatives N,N'-dibenzyldithiooxamide (DBDTO) and N,N'-bis-(2-octanoyl-oxyethyl)dithiooxamide (DOEDTO), and were optimized to give the most neutral black image colors. The preferred capsule formulations are given in Table IV.

TABLE IV

Optimized Hydrazone Fills

| Component | Weight % Hydrazone 21 | Weight % Hydrazone 20 |
|---|---|---|
| Hydrazone | 2.5 | 1.5 |
| DOEDTO | 4.0 | 4.0 |
| DBDTO | 1.5 | 1.5 |
| TBP (tributyl phosphate) | 15.0 | 15.0 |
| DEP (diethyl phthalate) | 15.0 | 15.0 |

TABLE IV-continued

Optimized Hydrazone Fills

| Component | Weight % Hydrazone 21 | Weight % Hydrazone 20 |
|---|---|---|
| Cyclohexane | 62.0 | 63.0 |
| | 100.0 | 100.0 |

Capsules containing the preferred o-amino substituted hydrazone, 2-OH-1-naphthaldehyde-o-aminobenzoyl hydrazone (number 21), yield handsheets with the characteristics listed in Table V.

TABLE V

Typical Handsheet Characteristics of 2-OH—1-Naphthaldehyde-o-aminobenzoyl hydrazone (hydrazone number 21)

| Light Source Color | Photovolt Reading in % Reflectance Green | Amber | Blue |
|---|---|---|---|
| Background (of non-imaged handsheet containing capsules) | 78 | $79\frac{1}{2}$ | 67 |
| Imaged Handsheets, 30 seconds after imaging | $33\frac{1}{2}$ | $36\frac{1}{2}$ | $33\frac{1}{2}$ |
| Imaged Handsheets, 1 hour after imaging | 29 | $32\frac{1}{2}$ | $31\frac{1}{2}$ |

Background color light yellow
Image color purple to purple gray

The capsule slurry of the 2-OH-1-naphthaldehyde-o-aminobenzoyl hydrazone is pH sensitive, being a cream color at a pH below 8 and a lemon yellow color at a pH above 8. This color change is rapid and reversible. The encapsulation technique described by Matson in U.S. Pat. No. 3,516,941 requires the pH of the slurry to be dropped to the range of 1 to 5 in order for encapsulation to occur. Encapsulation of the preferred o-amino substituted hydrazone according to Matson can result in self-contained handsheets which have a bright yellow color when the pH of the slurry is dropped to 2.0 or below. The yellow sheet background is probably due to the aqueous acid solubility of the hydrazone amino group. The hydrazone becomes incorporated into the capsule shell under the acidic encapsulation conditions. Hydrazone is leached from the fill into the aqueous acid phase resulting in poor handsheet characteristics (i.e. yellow background, low image density). It has been found that washing the hydrazone with methanol alleviates this problem. However, washing the hydrazone is expensive. The leaching problem can be corrected in laboratory encapsulations by replacing the fill cyclohexane with an aromatic solvent such as xylene. However, the xylene is often unacceptable for capsule production due to its offensive odor.

The particularly preferred p-(t-butyl)-hydrazone (2-OH-1-naphthaldehyde-p-(t-butyl)-benzoyl hydrazone), number 20, gives an acceptable blue-black image at a concentration of 1.5% in the preferred fill composition of Table IV. The preferred p-(t-butyl)-hydrazone fill was encapsulated according to Matson, U.S. Pat. No. 3,516,941, and used to make self-contained handsheets according to assignee's Canadian patent application No. 780,358. The characteristics of these handsheets are given in Table VI.

TABLE VI

| Typical Handsheets Characteristics of 2-OH—1-Naphthaldehyde-p-(t-butyl)-benzoyl hydrazone (hydrazone number 20) | | | |
|---|---|---|---|
| | Photovolt Reading in % Reflectance | | |
| Light Source Color | Green | Amber | Blue |
| Background (of non-imaged handsheets containing capsules) | 79 | 79 | 70 |
| Imaged Handsheets, 30 sec. after imaging | 27 | No Reading | No Reading |
| Imaged Handsheets, 1 hr. after imaging | 23 | 27 | 25 |

Background color white to off white
Image color blue-black

As with the preferred o-amino substituted hydrazone the initial image color of the handsheets is brown and requires about one minute to develop into the final blue-black color. The color of capsules made with preferred p-(t-butyl) substituted hydrazone is also pH sensitive, turning bright yellow at a pH greater than 9.5 to 10. This color change occurs rapidly and is reversible.

In order to provide a specific ilustration of the preparation and use of the aromatic substituted hydrazones of this invention, several examples will be considered.

EXAMPLE 1

Preparation of 2-hydroxy-1-naphthaldehyde-o-aminobenzoyl hydrazone (hydrazone #21)

The intermediate o-aminobenzhydrazide is prepared by refluxing 151 g (1.0 mol) methyl anthranilate and 55 g (1.1 mol) 64% aqueous hydrazine in a 250 ml round bottom flask for 2 hours. The product is recrystallized from 1.0 liter ethyl alcohol yielding 75 g of a light yellow solid, melting at 119°-121° C.

The hydrazone is prepared by refluxing 30.2 g (0.20 mol) o-aminobenzhydrazide, 34.4 g (0.20 mol) 2-hydroxy-1-naphthaldehyde and 250 ml toluene in a 500 ml flask for 1 hour. The solid formed is collected on a filter and washed with hot ethanol yielding 40 g of yellow 2-hydroxy-1-naphthaldehyde-o-aminobenzoyl hydrazone, melting at 188°-191° C.

EXAMPLE 2

Preparation of 2-hydroxy-1-naphthaldehyde p-(t-butyl)-benzoyl hydrazone

The reactant ester, methyl p-(t-butyl)-benzoate is prepared by refluxing a mixture of 178 g (1 mol) p-t-butyl benzoic acid, 96 g (3 mol) methanol, 300 ml dichloroethane, and 15 ml concentrated sulfuric acid for a 21 hour period. This mixture is washed four times with 500 ml water and 500 ml of a 10% sodium carbonate solution. The product is dried over calcium chloride and distilled, yielding 161 g of the ester boiling at 258°-262° C.

The intermediate hydrazide is prepared by refluxing 192 g of methyl p-(t-butyl)-benzoate (1.0 mol) and 55 g (1.1 mol) 64% aqueous hydrazine in a 500 ml flask for a total of 5 hours. Periodically, methanol, a by-product, is distilled from the flask to monitor the progress of the reaction. The hot product mixture is added with stirring to 2 liters of hot water and allowed to cool. The white solid formed is collected on a filter and dried. The yield of hydrazide (M.P. 127°-128° C.) was 185 g.

The hydrazone is prepared by refluxing a mixture of p-(t-butyl)-benzydrazide (76.8 g, 0.40 mol), 2-hydroxy-1-naphthaldehyde (68.8 g. 0.40 mol), and toluene (500 ml) in a 1-liter flask fitted with a Dean-Stark water separator, reflux condenser, and stirrer until water is no longer collected (2 hours). Upon cooling, the yellow product is collected on a filter and air dried. The yield of hydrazone was 133 g, and its melting point was 259°-261° C.

EXAMPLE 3

Salicyladehyde benzoylhydrazone is prepared according to the following procedure.

A mixture of 13.6 g benzhydrazide, 12.2 g salicylaldehyde, and 50 ml of toluene is refluxed in a boiling flask fitted with a Dean-Stark water separator and reflux condenser until water no longer separates, about 1 hour. The product is collected by suction filtration and recrystallized from alcohol. The yield of pale yellow needles, m.p. 172°-175° C., is 72% of theoretical.

EXAMPLE 4

Urea-formaldehyde microcapsules containing 2-hydroxy-1-naphthaldehyde p-(t-butyl)-benzoyl hydrazone are prepared as follows:

The urea-formaldehyde solution is prepared by heating 1855 g of 37% formaldehyde, 695 g urea, and 10.3 g triethanolamine at 160° F. for 2½ hours with agitation. At the end of the 2½ hr period, the hot precondensate solution is diluted with 3160 g soft water.

The capsule fill solution consists of:

| | parts by weight |
|---|---|
| Tributyl phosphate | 20 |
| Diethyl phthalate | 10 |
| N,N'bis(-2-octanoyloxy ethyl) dithiooxamide | 4 |
| N,N'-dibenzyl dithiooxamide | 1.5 |
| Hydrazone | 2.5 |
| Cyclohexane | 62 |
| | 100.0 |

To make capsules, 4500 ml precondensate solution and 450 g sodium chloride are charged to a 8 liter beaker and the solution is continuously agitated. The solution is neutralized (pH ~7) with 12.5% hydrochloric acid and 1100 g of fill solution is added. The temperature is adjusted to 68° F. and the stirrer is adjusted to 4000 RPM. The pH of the solution is slowly reduced, by addition of 12.5% HCL, to about 1.65 over a 30 minute period. One hour after the end of the acid addition, the temperature is increased to 145° C., and the reaction is allowed to proceed for an additional 1 ¾ hours, at which point it is neutralized with 10% sodium hydroxide.

EXAMPLE 5

A self-contained imaging handsheet is prepared utilizing bleached sulfite pulp at 1.57% solids and 80° SR (Schopper-Riegler freeness), and the capsules of Example 4.

| Material | |
|---|---|
| Pulp | 635 ml |
| Capsules | 4 g |
| 10% $NiSo_4 \cdot 6H_2O$ | 4 ml |
| 10% Sodium rosinate | 8 ml |
| Water | 1365 ml |

The above materials are mixed in the order listed, with a 1–2 minute mixing time between additions. 400 ml of this slurry is diluted to 3300 ml in an 8×8 inch handsheet mold, and the sheet is formed on a 100 mesh wire. The sheet is pressed between blotter stock and dried on a hot can drier.

When marked by pressure, an immediate brown image is produced which rapidly changes to the final black image color.

EXAMPLE 6

A manifolding paper is made as follows:

Urea-formaldehyde capsules are prepared containing the following fill solution.

| | Parts by Weight |
|---|---|
| Tributyl phosphate | 15 |
| Diethyl phthalate | 15 |
| N,N'-bis(2-octanoyloxy ethyl) dithiooxamide | 6 |
| N,N'-dibenzyl dithiooxamide | 1.5 |
| 2-Hydroxy-1-naphthaldehyde p-(t-butyl)-benzoylhydrazone | 2 |
| Cyclohexane | 60.5 |
| | 100.0 |

A coating slurry is prepared by combining 27 parts water, 38 parts capsules, 3.8 parts styrene-butadiene latex and 20 parts of a 20% solution of oxidized starch. This slurry is coated at 4.0 lbs/3000 $ft^2$ on bond paper. The coating is applied to the back side of the sheet. When this sheet is brought in contact with a sheet containing nickel resinate and imaged by pressure, the initial image color is brown, but rapidly changes to blue-black.

EXAMPLE 7

Thumb pads are prepared by saturating blotter stock with the following solutions:

| | Parts by Weight |
|---|---|
| Solution A | |
| Tributyl phosphate | 47 |
| Trioctyl phosphate | 47 |
| N,N'-bis(2-octanoyloxyethyl)-dithiooxamide | 4 |
| N,N'-Dibenzyldithiooxamide | 2 |
| 2-Hydroxy-1-naphthaldehyde-o-aminobenzoyl hydrazone | 3 |
| Solution B | |
| Tributyl phosphate | 47 |
| Trioctyl phosphate | 47 |
| N,N'-Bis(2-oxtanoyloxyethyl)-dithiooxamide | 4 |
| N,N'-Dibenzyldithiooxamide | 2 |
| 2-Hydroxy-1-naphthaldehyde-p-(t-butyl)-benzoyl hydrazone | 3 |

Use of the blotters saturated with solutions A or B give black thumb print images when pressed against a nickel containing sheet.

EXAMPLE 8

Ribbon or Stamp Pad Application

The DTO-Hydrazone solutions used for the thumb pads of Example 7 could also be used to "ink" stamp pads or computer and typewriter ribbons. Transfer of this fluid to sheet containing a nickel salt with either a stamp or by striking the ribbon while in contact with the sheet will produce a blue-black to black image.

What is claimed is:

1. A composition capable of forming colored complexes with transition metal salts comprising an aromatic substituted hydrazone carried in an organic cosolvent vehicle, said hydrazone having the formula

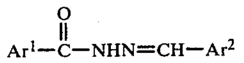

wherein $Ar^1$ and $Ar^2$ are independently selected aromatic substituents, $Ar^1$ being selected from the group of aromatic substituents consisting of phenyl, substituted phenyl, napthyl, and substituted naphthyl and $Ar^2$ being selected from the group of aromatic substituents consisting of o-hydroxy substituted phenyl and o-hydroxy substituted naphthyl.

2. The composition of claim 1 wherein $Ar^1$ is an aromatic radical having the structure

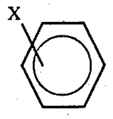

wherein X is selected from the group consisting of H; p—$CH_3$; p-(t-$C_4H_9$); and o-$NH_2$; and wherein $Ar^2$ is an o-hydroxy aromatic radical having the structure

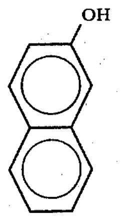

3. A composition capable of forming colored complexes with transition metal salts comprising an aromatic substituted hydrazone carried in an organic cosolvent vehicle, said hydrazone having the formula

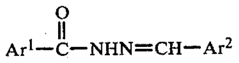

wherein $Ar^1$ and $Ar^2$ are independently selected aromatic substituents, $Ar^1$ being selected from the group of aromatic substituents consisting of phenyl, substituted phenyl, naphthyl, and substituted naphthyl and $Ar^2$ being selected from the group of aromatic substituents consisting of o-hydroxy substituted phenyl and o-hydroxy substituted naphthyl; wherein said aromatic substituted hydrazone is present in said cosolvent in an amount of between about 0.2 and 10.0 percent by weight.

4. A composition capable of forming colored complexes with transition metal salts comprising an aromatic substituted hydrazone carried in an organic cosolvent vehicle, said hydrazone having the formula

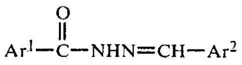

wherein

Ar[1] is an aromatic radical having the structure

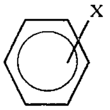

wherein X is selected from the group consisting of H; $CH_3$; p-(t-$C_4H_9$); o-OH; p-OH; o-Cl; o-$NH_2$; p-$NH_2$; m-$NO_2$; p-$NO_2$; and m-$CH_3$; o-OH; and wherein Ar[2] is an o-hydroxy aromatic radical having the structure

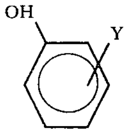

wherein Y is selected from the group consisting of H; 5-$NO_2$; 5-Cl; 3-$CH_3O$; and 3-$C_2H_5O$.

5. A composition capable of forming colored complexes with transition metal salts comprising an aromatic substituted hydrazone carried in an organic cosolvent vehicle, said hydrazone having the formula

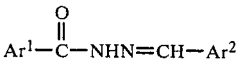

wherein

Ar[1] is an aromatic radical having the structure

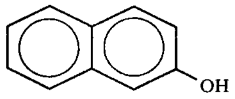

and wherein

Ar[2] is an o-hydroxy aromatic radical having the structure

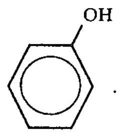

6. A composition capable of forming colored complexes with transition metal salts comprising an aromatic substituted hydrazone carried in an organic cosolvent vehicle, said hydrazone having the formula

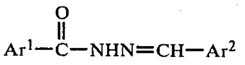

wherein

Ar[1] is an aromatic radical having the structure

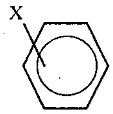

wherein X is selected from the group consisting of p-(t-$C_4H_9$) and o-$NH_2$, and wherein Ar[2] is an o-hydroxy aromatic radical having the structure

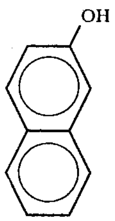

7. A composition capable of forming colored complexes with transition metal salts comprising an aromatic substituted hydrazone carried in an organic cosolvent vehicle and a dithiooxamide complexing compound; said hydrazone having the formula

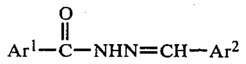

wherein Ar[1] and Ar[2] are independently selected aromatic substituents, Ar[1] being selected from the group of aromatic substituents consisting of phenyl, substituted phenyl, naphthyl, and substituted naphthyl and Ar[2] being selected from the group of aromatic substituents consisting of o-hydroxy substituted phenyl and o-hydroxy substituted naphthyl.

8. A composition capable of forming colored complexes with transition metal salts comprising an aromatic substituted hydrazone carried in an organic cosolvent vehicle, said hydrazone having the formula

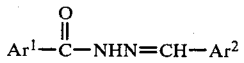

wherein Ar[1] and Ar[2] are independently selected aromatic substituents, Ar[1] being selected from the group of aromatic substituents consisting of phenyl, substituted phenyl, naphthyl, and substituted naphthyl and Ar[2] being selected from the group of aromatic substituents consisting of o-hydroxy substituted phenyl and o-hydroxy substituted naphthyl; said composition encapsulated in a substantially impermeable, pressure-rupturable microcapsule.

9. An encapsulated composition according to claim 8, wherein said aromatic substituted hydrazone is present in said cosolvent in an amount of between 0.2 and 10.0 percent by weight of the capsule fill.

10. An encapsulated composition according to claim 8 wherein said composition additionally comprises a dithiooxamide complexing compound encapsulated in a substantially impermeable, pressure-rupturable microcapsule.

11. An article for providing an image-forming coreactant comprising a carrier means carrying a color forming coreactant, said color-forming coreactant comprising an aromatic substituted hydrazone in a reaction-implementing cosolvent vehicle, said hydrazone having the formula

wherein $Ar^1$ and $Ar^2$ are independently selected aromatic substituents, $Ar^1$ being selected from the group of aromatic substituents consisting of phenyl, substituted phenyl, napthyl, and substituted naphthyl and $Ar^2$ being selected from the group of aromatic substituents consisting of o-hydroxy substituted phenyl and o-hydroxy substituted naphthyl.

12. The article of claim 11 wherein, said aromatic substituted hydrazone is present in said reaction-implementing cosolvent vehicle in an amount of between 0.2 and 10.0 percent by weight.

13. The article of claim 11 wherein, $Ar^1$ is an aromatic radical having the structure

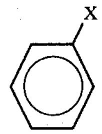

wherein X is selected from the group consisting of H; $CH_3$; p-(t-$C_4H_9$); o-OH; p-OH; o-Cl; o-$NH_2$; p-$NH_2$; m-$NO_2$; p-$No_2$; and m-$CH_3$, o-OH; and wherein $Ar^2$ is an o-hydroxy aromatic radical having the structure

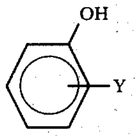

wherein Y is selected from the group consisting of H; 5-$NO_2$; 5-Cl; 3-$CH_3O$; and 3-$C_2H_5O$.

14. The article of claim 11 wherein, $Ar^1$ is an aromatic radical having the structure

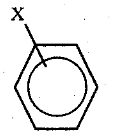

wherein X is selected from the group consisting of H; p-$CH_3$; p-(t-$C_4H_9$); and o-$NH_2$; and wherein $Ar^2$ is an o-hydroxy aromatic radical having the structure

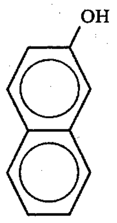

15. The article of claim 11 wherein; $Ar^1$ is an aromatic radical having the structure

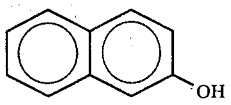

and wherein $Ar^2$ is an o-hydroxy aromatic radical having the structure

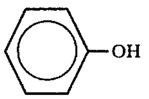

16. The article of claim 11 wherin said color-forming coreactant additionally comprises a dithiooxamide complexing compound.

17. An article according to claim 11 wherein said carrier means is a transfer ribbon.

18. An article according to claim 11 wherein said carrier means is an absorbent transfer pad.

19. An article according to claim 11 wherein said carrier means is a paper sheet.

20. An article according to claim 19 wherein said color-forming coreactant is contained in substantially impermeable pressure rupturable capsules.

21. An article according to claim 20 wherein said aromatic substituted hydrazone is selected from the group consisting of 2-hydroxy-1-naphthaldehyde-p-(t-butyl)-benzoyl hydrazone and 2-hydroxy-1-naphthaldehyde-o-aminobenzoyl hydrazone.

22. An article according to claim 21 wherein said color forming coreactant additionally comprises a dithiooxamide complexing compound selected from the group consisting of N,N'-dibenzyl-dithiooxamide and N,N'-bis-(2-octanoyloxyethyl)dithiooxamide.

23. An article according to claim 22 wherein said aromatic substituted hydrazone is present in said cosolvent vehicle in an amount of between about 1.5 and 3.5 percent by weight of the capsule fill.

24. A record sheet comprising a paper sheet having on at least a portion of at least one major surface a color-forming coreactant comprising aromatic substituted hydrazone and a cosolvent vehicle, said hydrazone having the formula

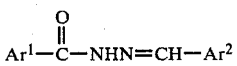

wherein $Ar^1$ and $Ar^2$ are independently selected aromatic substituents, $Ar^1$ being selected from the group of aromatic substituents consisting of phenyl, substituted phenyl, napthyl, and substituted naphthyl and $Ar^2$ being selected from the group of aromatic substituents consisting of o-hydroxy substituted phenyl and o-hydroxy substituted naphthyl.

25. A record sheet according to claim 24 wherein, $Ar^1$ is an aromatic radical having the structure

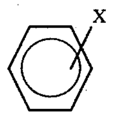

wherein X is selected from the group consisting of H; $CH_3$; p-(t-$C_4H_9$); o-OH; p-OH; o-Cl; o-$NH_2$; p-$NH_2$; m-$NO_2$; p-$NO_2$; and m-$CH_3$, o-OH; and wherein $Ar^2$ is an o-hydroxy aromatic radical having the structure

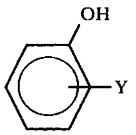

wherein Y is selected from the group consisting of H; 5-$NO_2$; 5-Cl; 3-$CH_3O$; and 3-$C_2H_5O$.

26. A record sheet according to claim 24 wherein $Ar^1$ is an aromatic radical having the structure

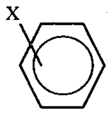

wherein X is selected from the group consisting of H; p-$CH_3$; p-(t-$C_4H_9$); and o-$NH_2$; and wherein $Ar^2$ is an o-hydroxy aromatic radical having the structure

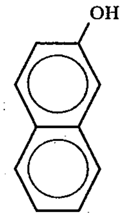

27. A record sheet according to claim 24 wherein said color-forming coreactant additionally comprises a dithiooxamide complexing compound.

28. A record sheet according to claim 24 wherein said color-forming coreactant and cosolvent vehicle are encapsulated in impermeable, pressure-rupturable microcapsules.

29. A record sheet according to claim 28 wherein $Ar^1$ is an aromatic radical having the structure

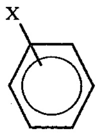

wherein X iis selected from the group consisting of H; p-$CH_3$; p-(t-$C_4H_9$); and o-$NH_2$; and wherein $Ar^2$ is an o-hydroxy aromatic radical having the structure

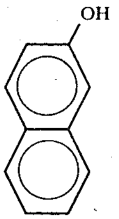

30. A record sheet according to claim 29 wherein said color-forming coreactant additionally comprises a dithiooxamide complexing compound selected from the group consisting of N,N'-dibenzyl dithiooxamide and N,N'-bis-(2-octanoyl oxyethyl) dithiooxamide encapsulated in a substantially impermeable, pressure-rupturable microcapsule.

31. A manifold form comprising at least two sheets connected along a common edge wherein at least one of said sheets is a record sheet according to claim 24.

32. A system for forming colored markings from substantially colorless first and second coreactants comprising:

(a) a carrier means carrying a first color-forming coreactant, said first coreactant comprising an aromatic substituted hydrazone and a reaction-implementing cosolvent vehicle, said hydrazone having the formula $$Ar^1-\overset{O}{\overset{\|}{C}}-NHN=CH-Ar^2$$

wherein $Ar^1$ and $Ar^2$ are independently selected aromatic substituents, $Ar^1$ being selected from the group of aromatic substituents consisting of phenyl, substituted phenyl, napthyl, and substituted naphthyl and $Ar^2$ being selected from the group of aromatic substituents consisting of o-hydroxy substituted phenyl and o-hydroxy substituted naphthyl, (b) a record sheet having on at least a portion of one major surface a second coreactant comprising a transition metal salt, (c) transfer means for transferring at least a portion of said first coreactant to selected areas of said record sheet having said second coreactant.

33. A color-forming system according to claim 32 wherein said aromatic substituted hydrazone is selected from the group consisting of 2-hydroxy-1-naphthaldehyde-p-(t-butyl)-benzoyl hydrazone and 2-hydroxy-1-naphthaldehyde-o-aminobenzoyl hydrazone.

34. A color-forming system according to claim 32 wherein said transition metal is selected from the group consisting of nickel, tin, zinc, iron, cobalt, copper, and cadmium.

35. A color-forming system according to claim 32 wherein, said transfer means comprises means for bringing into contact said carrier means and said record sheet in selected areas.

36. A color-forming system according to claim 32 wherein, said transfer means is a portion of the human body.

* * * * *